(12) United States Patent
Onishi

(10) Patent No.: US 11,489,971 B2
(45) Date of Patent: Nov. 1, 2022

(54) INFORMATION PRESENTING DEVICE, INFORMATION PRESENTING METHOD AND RECORDING MEDIUM

(71) Applicant: NEC Corporation, Tokyo (JP)

(72) Inventor: Takeo Onishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 771 days.

(21) Appl. No.: 16/300,607

(22) PCT Filed: May 15, 2017

(86) PCT No.: PCT/JP2017/018159
§ 371 (c)(1),
(2) Date: Nov. 12, 2018

(87) PCT Pub. No.: WO2017/199898
PCT Pub. Date: Nov. 23, 2017

(65) Prior Publication Data
US 2019/0306325 A1 Oct. 3, 2019

(30) Foreign Application Priority Data

May 19, 2016 (JP) .............................. JP2016-100410

(51) Int. Cl.
*H04W 4/029* (2018.01)
*H04M 15/00* (2006.01)
(Continued)

(52) U.S. Cl.
CPC ......... *H04M 15/8016* (2013.01); *H04M 1/00* (2013.01); *H04M 11/00* (2013.01);
(Continued)

(58) Field of Classification Search
CPC .... H04M 1/00; H04M 11/00; H04M 15/8016; H04M 15/8033; H04M 15/83;
(Continued)

(56) References Cited

U.S. PATENT DOCUMENTS

| 8,312,660 B1 * | 11/2012 | Fujisaki | ................. F41A 17/08 |
| | | | 455/457 |
| 9,408,027 B2 * | 8/2016 | Tsuda | ................... H04B 17/318 |

(Continued)

FOREIGN PATENT DOCUMENTS

| CN | 103024672 B | * | 3/2015 | |
| EP | 1235451 A1 | * | 8/2002 | .............. H04W 4/02 |

(Continued)

OTHER PUBLICATIONS

"Android (registered trademark) Developers", URL:http://developer.android.com/intl/ja/guide/topics/ui/notifiers/notifications.html (27 pages total).

(Continued)

*Primary Examiner* — Wutchung Chu

(57) ABSTRACT

To provide portable information processing devices which is capable of effectively presenting to a user an action that improves communication quality. The information presenting devices include: a communication quality acquisition means that acquires current communication quality and communication quality when a user takes an action; an action cost calculation means that calculates a cost of the action; an information presentation determining means that determines whether information about the action is to be displayed, based on the current communication quality, the communication quality when the action is taken, and the action cost; an action information generating means that determines the action based on the communication quality when the action is taken and the action cost when the information presentation determining means determines that information about the action is to be displayed; and an information presenting means that displays information about the action determined by the action information generating means.

15 Claims, 8 Drawing Sheets

(51) Int. Cl.
*H04W 24/10* (2009.01)
*H04W 88/02* (2009.01)
*H04M 1/00* (2006.01)
*H04M 11/00* (2006.01)

(52) U.S. Cl.
CPC ....... *H04M 15/8033* (2013.01); *H04W 4/029* (2018.02); *H04W 24/10* (2013.01); *H04W 88/02* (2013.01); *H04M 2215/143* (2013.01)

(58) Field of Classification Search
CPC .... H04M 15/84; H04M 15/85; H04M 15/851; H04M 2215/143; H04M 1/72454; H04W 24/10; H04W 4/02; H04W 4/029; H04W 4/24; H04W 48/16; H04W 88/02; H04W 28/0236; H04W 24/08; H04W 28/0226; H04W 16/26; H04W 36/30; H04W 48/20; H04W 72/048; H04W 48/18; H04W 36/14; H04W 72/02; H04W 24/00; H04W 24/02; H04W 36/00837; H04W 72/04; H04W 16/28; H04W 16/18; H04W 36/32; H04W 40/12; H04W 72/085; H04W 36/08; H04W 16/10; H04W 24/04; H04W 4/023; H04W 4/024; H04B 7/0691; H04B 7/0491; H04B 17/309; H04B 7/0617; H04B 7/0695; H04B 7/0408; H04B 7/0452; H04B 7/06; H04L 1/0002
See application file for complete search history.

(56) References Cited

U.S. PATENT DOCUMENTS

| 10,015,636 | B2 * | 7/2018 | Tsuda | H04L 1/20 |
| 2007/0183344 | A1 * | 8/2007 | Joshi | H04W 8/02 370/254 |
| 2011/0144899 | A1 * | 6/2011 | Soelberg | G01C 21/00 701/532 |
| 2011/0263244 | A1 * | 10/2011 | Kobayashi | H04W 24/08 455/423 |
| 2012/0262335 | A1 * | 10/2012 | Holcman | H04W 24/10 342/357.42 |
| 2012/0310872 | A1 | 12/2012 | Anderson | |
| 2013/0317944 | A1 * | 11/2013 | Huang | H04W 4/02 455/457 |
| 2014/0200038 | A1 * | 7/2014 | Rao | G01C 21/32 455/457 |
| 2014/0234819 | A1 | 8/2014 | Tanaka et al. | |
| 2015/0148064 | A1 * | 5/2015 | Tsuda | G01C 21/32 455/456.1 |
| 2015/0181374 | A1 * | 6/2015 | Tsuda | H04W 4/02 455/457 |
| 2016/0127273 | A1 * | 5/2016 | Jin | H04B 17/309 455/423 |
| 2016/0189495 | A1 * | 6/2016 | Yin | H04B 1/3833 455/67.7 |
| 2016/0242098 | A1 * | 8/2016 | Tsukamoto | H04W 24/08 |
| 2016/0345134 | A1 * | 11/2016 | Tsuda | H04L 43/0888 |
| 2017/0215093 | A1 * | 7/2017 | Zhang | H04W 24/02 |
| 2018/0024985 | A1 * | 1/2018 | Asano | G06F 40/20 704/275 |

FOREIGN PATENT DOCUMENTS

| JP | 2006186475 | A | 7/2006 | |
| JP | 200842628 | A | 2/2008 | |
| JP | 201161299 | A | 3/2011 | |
| JP | 201417558 | A | 1/2014 | |
| WO | 2012157496 | A1 | 11/2012 | |
| WO | 2012167058 | A1 | 12/2012 | |
| WO | 2014007009 | A1 | 1/2014 | |
| WO | WO-2018227997 | A1 * | 12/2018 | ......... G06F 11/1443 |

OTHER PUBLICATIONS

International Search Report, issued by International Searching Authority in corresponding International Application No. PCT/JP2017/018159, dated Aug. 1, 2017.

* cited by examiner

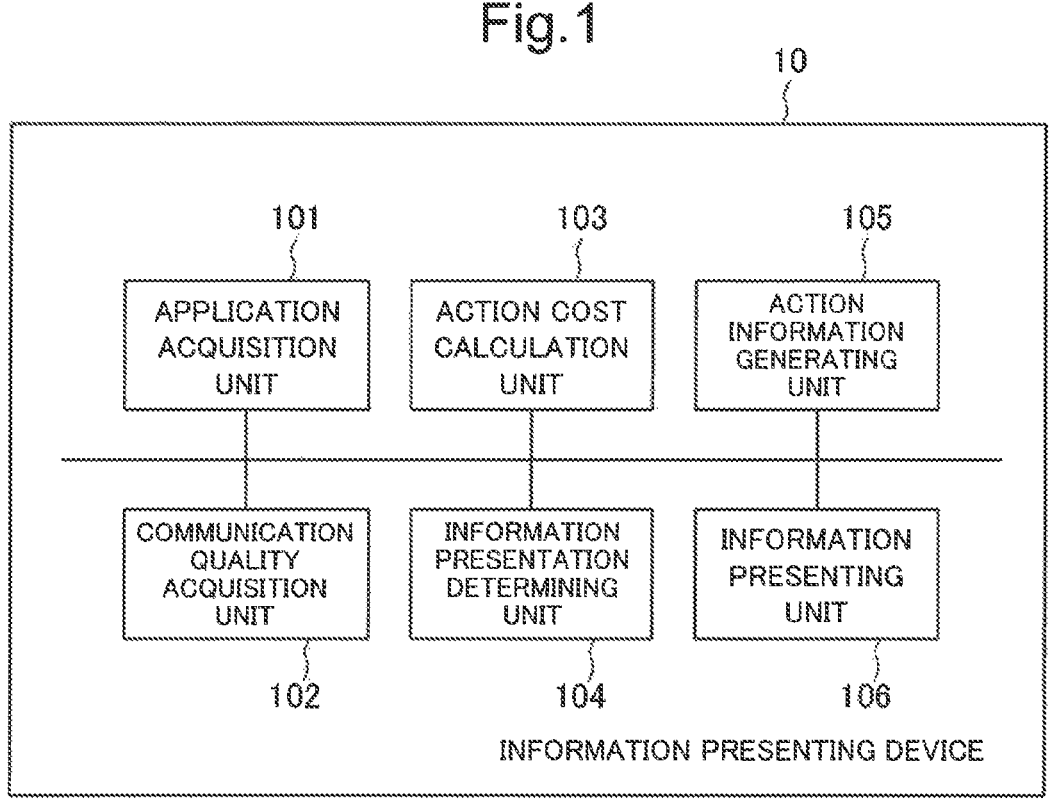

Fig.3

| POSITION | RADIO WAVE INTENSITY (dBm) | MOVEMENT DISTANCE (m) |
|---|---|---|
| 35.681624,139.764841 | −103 | 0 |
| 35.682748,139.763736 | −91 | 160 |
| 35.682713,139.759774 | −85 | 474 |
| 35.681801,139.762344 | −81 | 227 |
| ⋮ | ⋮ | ⋮ |

Fig.4

| APPLICATION | THRESHOLD (dBm) |
|---|---|
| A MAIL | −105 |
| B CHAT | −110 |
| C BROWSER | −95 |
| D MOVING IMAGE | −90 |
| ⋮ | ⋮ |

Fig.8

| ACTION COST | ADOPTION/REJECTION RESULT |
|---|---|
| 130m | ○ |
| 240m | × |
| 500m | × |
| 240m | ○ |
| ⋮ | ⋮ | ic presenting device, an information presenting method, and a recording medium. Particularly, the present invention relates to a technique of presenting, by a portable information processing device, information related to communication quality to a user of the information processing device.

INFORMATION PRESENTING DEVICE, INFORMATION PRESENTING METHOD AND RECORDING MEDIUM

This application is a National Stage Entry of PCT/JP2017/018159 filed on May 15, 2017, which claims priority from Japanese Patent Application 2016-100410 filed on May 19, 2016, the contents of all of which are incorporated herein by reference, in their entirety.

TECHNICAL FIELD

The present invention relates to an information presenting device, an information presenting method, and a recording medium. Particularly, the present invention relates to a technique of presenting, by a portable information processing device, information related to communication quality to a user of the information processing device.

BACKGROUND ART

In a portable information processing device, such as a smartphone, utilizing a mobile communication network (hereinafter, simply referred to as a "mobile network"), deterioration of communication quality may be caused by a decrease of receiving radio wave intensity and congestion of a mobile network.

Such deterioration of communication quality may be lessened by movement of a user of the information processing device. For example, a user can obtain a good communication quality by moving from a place at low receiving radio wave intensity to a place at high receiving radio wave intensity. Therefore, for a user who wants to enjoy a good communication quality, it is important to know beforehand how communication quality changes due to an action (e.g., movement from one place to another) taken by the user of the information processing device himself/herself.

For example, PTL 1 discloses a method of determining a position where communication quality can be improved, based on time-series data about a communication quality, and presenting the position to a user. According to the technique, a user of the information processing device is able to know a position where communication quality will be improved. Therefore, the user can improve communication quality by moving to the presented position. PTL 2 discloses a method by which a user of an information processing device knows a current communication quality by a small image which is called an antenna pictogram, and displayed on an upper part of a screen of the information processing device.

Furthermore, NPL 1 discloses that information is presented to a user of an information processing device by using a notification method called a heads-up notification. According to the methods disclosed by PTL 1 and NPL 1, when a position where communication quality will be improved exists, it is possible to notify of the position where communication quality will be improved.

CITATION LIST

Patent Literature

[PTL 1]
Japanese Unexamined Patent Application Publication No. 2014-17558
[PTL 2]
International Publication No. WO2014/007009

Non Patent Literature

[NPL 1]
"Android (registered trademark) Developers", [online], [retrieved on May 19, 2016], Internet <URL: http://developer.android.com/intl/ja/guide/topics/ui/notifiers/notifications.html>

SUMMARY OF INVENTION

Technical Problem

According to the technique described above, a user of an information processing device is able to know an action necessary to improve a communication quality. In other words, a user is able to improve communication quality by taking an appropriate action based on the presented information. However, with this technique, there is a possibility that a user is not able to effectively refer to information necessary to improve a communication quality. The reason is described below in detail.

Generally, in the case where a user refers to information, the user himself/herself checks information when necessary. For example, when a user feels that communication quality is poor, the user starts an application program with which an action that improves communication quality can be checked.

However, when a presented action serving to improve communication quality needs considerable time and labor (e.g. moving several kilometers), a user does not adopt the presented action. Further, when a degree of that improves communication quality is limited, the user does not adopt the presented action either. In this case, the user has referred to information wastefully.

Furthermore, when a user refers to information, and does not adopt a presented action repeatedly, there is a possibility that the user gives up referring to information (e.g., gives up using an application program with which an action that improves communication quality can be checked).

Instead of voluntary reference to information by a user, it is also possible to notify the user when it is determined on the information processing device side that an action that improves communication quality exists.

However, a user does not necessarily need to improve a communication quality. For example, when a user of an information processing device is using an application program, such as e-mail or chat, that is low in communication amount, a good communication quality is not much needed. When a notification as disclosed in PTL 1 and NPL 1 frequently occurs in such cases of a small effect of improvement, much labor for improvement, low necessity for improvement, and the like, a user does not adopt notified information. Moreover, such notifications prevent use of the information processing device.

The present invention has been made in view of issues described above, and is mainly intended to provide a portable information processing device and the like which effectively presents to a user an action that improves communication quality.

Solution to Problem

An information presenting device of the present invention includes: a communication quality acquisition means that acquires current communication quality and communication quality when a user takes an action; an action cost calculation means that calculates a cost of the action; an information presentation determining means that determines whether information about the action is to be displayed, based on the current communication quality, the communication quality when the action is taken, and the action cost; an action information generating means that determines the action based on the communication quality when the action is taken and the action cost when the information presentation determining means determines that information about the action is to be displayed; and an information presenting means that displays information about the action determined by the action information generating means.

An information presenting method of the present invention includes: acquiring current communication quality and communication quality when a user takes an action; calculating a cost of the action; determining whether information about the action is to be displayed, based on the current communication quality, the communication quality when the action is taken, and the action cost; determining the action based on the communication quality when the action is taken and the action cost when determined that information about the action is to be displayed; and displaying information about the determined action.

An information presenting program of the present invention causes a computer to execute: communication quality acquisition processing of acquiring current communication quality and communication quality when a user takes an action; action cost calculation processing of calculating a cost of the action; information presentation determining processing of determining whether information about the action is to be displayed, based on the current communication quality, the communication quality when the action is taken, and the action cost; action information generating processing of determining the action based on the communication quality when the action is taken and the action cost when the information presentation determining processing determines that information about the action is to be displayed; and information presenting processing of displaying information about the action determined in the action information generating processing.

The program may be included in a non-transitory recording medium.

Advantageous Effects of Invention

Portable information processing devices according to the present invention are capable of effectively presenting to a user an action that improves communication quality.

BRIEF DESCRIPTION OF DRAWINGS

FIG. 1 is a block diagram illustrating one example of a configuration of an information presenting device according to a first example embodiment of the present invention.

FIG. 2 is a diagram illustrating one example of communication quality information generated by a communication quality acquisition unit.

FIG. 3 is a diagram illustrating one example of an action cost calculated by an action cost calculation unit.

FIG. 4 is a diagram illustrating one example of a quality threshold for each application.

FIG. 8 is a diagram illustrating one example of information recorded by an adoption/rejection history recording unit.

EXAMPLE EMBODIMENT

Figure 5:
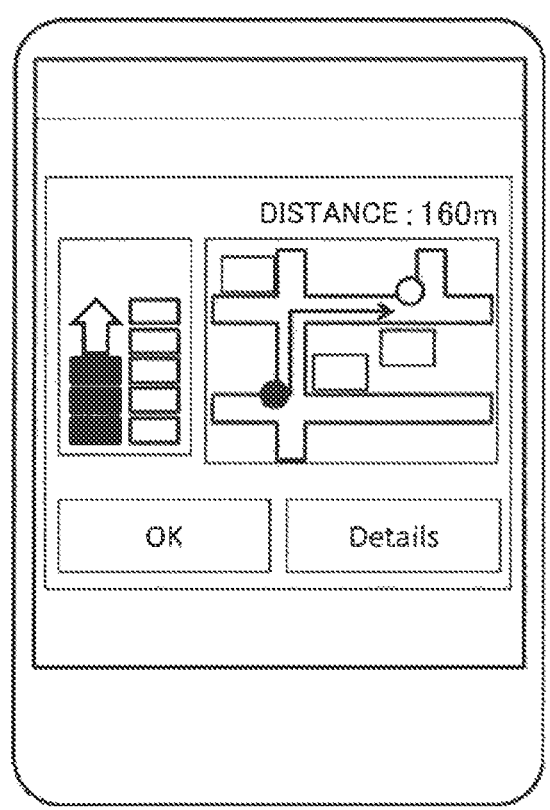
FIG. 5 is a view illustrating one example of action information presented by an information presenting unit.

Hereinafter, embodiments of the present invention will be described in detail with reference to the drawings.

First Example Embodiment

FIG. 1 is a block diagram illustrating a configuration of information presenting device 10 according to a first example embodiment. Information presenting device 10 according to the first example embodiment includes application acquisition unit 101, communication quality acquisition unit 102, action cost calculation unit 103, information presentation determining unit 104, action information generating unit 105, and information presenting unit 106. Hereinafter, components of information presenting device 10 are described in detail.

Note that information presenting device 10 also includes components that are typically included in a portable information processing device such as a tablet terminal device, a smartphone, or a mobile phone. Such a component is, for example, a processor and an operating system which execute an application program (hereinafter, abbreviated as an "application"). However, herein, descriptions of these components are omitted.

Application acquisition unit 101 acquires an application (not illustrated in FIG. 1) operating in information presenting device 10. The operating application is, for example, an application being displayed on a screen (not illustrated in FIG. 1) of information presenting device 10. When a plurality of applications can be simultaneously displayed, application acquisition unit 101 may acquire an application on which an input operation is last performed by a user of information presenting device 10, or may acquire a list of applications being displayed on the screen.

Communication quality acquisition unit 102 acquires the communication quality of information presenting device 10 at a current position and each of one or more other positions and generates communication quality information. The communication quality information includes at least a position, and a communication quality at the position. A position may be, for example, a latitude/longitude, or an address. A communication quality may be, for example, radio wave intensity received by information presenting device 10 from a base station of a mobile network, a degree of congestion of a base station, or a throughput of a data communication with a communication device disposed on a network.

FIG. 2 is a diagram illustrating one example of communication quality information generated by communication quality acquisition unit 102 according to the first example embodiment. As illustrated in FIG. 2, communication quality information is a table in which a pair of a position and radio wave intensity as a communication quality are in one row. In the communication quality information example in FIG. 2, a position indicates a latitude and a longitude, and a communication quality indicates radio wave intensity (dBm) at the position. For example, referring to a first row in FIG. 2, a position is "35.681624, 139.764841", and radio wave intensity is "−103 dBm". This indicates that radio wave intensity is −103 dBm in a position at a latitude of 35.681624 and a longitude of 139.764841. Other rows indicate radio wave intensity at particular positions in a similar manner.

For example, communication quality acquisition unit 102 directly measures and thus acquires a communication quality at the current position. As one example, communication quality acquisition unit 102 acquires a current position by a global positioning system (GPS). Moreover, communication quality acquisition unit 102 measures radio wave intensity from a base station to which information presenting device 10 is connected.

As a communication quality at another position, communication quality acquisition unit 102 uses, for example, a communication quality measured by information presenting device 10 in the past. Alternatively, communication quality acquisition unit 102 may acquire from a server, which is disposed on a network, recording communication quality information at each position. By acquiring from the server, it is possible to acquire a communication quality at a position which information presenting device 10 has never visited in the past.

Action cost calculation unit 103 calculates a cost (action cost) related to an action that improves communication quality presented by information presenting device 10. In the case described in the present example, an action cost is a distance of movement. Note that the distance is one example only, and an action cost may be, for example, time necessary for movement. In the present example, action cost calculation unit 103 calculates an action cost based on the position in the quality information acquired by communication quality acquisition unit 102.

FIG. 3 is a diagram illustrating one example of an action cost calculated by action cost calculation unit 103. As illustrated in FIG. 3, action cost calculation unit 103 calculates a movement distance from the current position of information presenting device 10 as an action cost, for each position acquired by communication quality acquisition unit 102. For example, referring to the second row in FIG. 2, a position is "35.682748, 139.763736". When the current position of information presenting device 10 is "35.681624, 139.764841" indicated in the first row in FIG. 3, an action cost (herein, a movement distance) for the position described in the second row in FIG. 2 is calculated as 160 m which is a distance between the two positions.

Information presentation determining unit 104 determines whether to present action information at information presenting unit 106, based on the application determined by application acquisition unit 101, the communication quality improved by the communication quality information acquired by communication quality acquisition unit 102 and the action that improves communication quality, and the action cost calculated by action cost calculation unit 103. Herein, an action information value is information related to an action that improves communication quality. One example of a method by which information presentation determining unit 104 determines whether to present action information is described below.

First, in information presentation determining unit 104, a threshold (hereinafter, described as a quality threshold) regarding a communication quality is set for each application. When a current communication quality of information presenting device 10 is equal to or more than the quality threshold, information presentation determining unit 104 determines that action information is not to be presented. FIG. 4 is a diagram illustrating one example of a quality threshold used by information presentation determining unit 104. In the present example, radio wave intensity (dBm) is used as a quality threshold. As illustrated in FIG. 4, the quality threshold is a set of thresholds of a communication quality (herein, radio wave intensity) for each application. For example, referring to the first row in FIG. 4, "−105 dBm" is set as a threshold of radio wave intensity for an application called an "A mail". Herein, an application acquired by application acquisition unit 101, currently used in information presenting device 10 is the "A mail" and the current radio wave intensity acquired by communication quality acquisition unit 102 is "−103 dBm", the current communication quality is better than the quality threshold. In this case, information presentation determining unit 104 determines that action information is not to be presented.

In this way, it is possible to suppress a notification of action information unnecessary for a user of information presenting device 10 when a communication quality sufficient for use of an application has been already obtained.

On the other hand, when an application currently used in information presenting device 10 is a "C browser", a quality threshold is "−95 dBm", while current radio wave intensity is "−103 dBm", information presentation determining unit 104 determines that the communication quality is lower than the quality threshold. In this case, based on the communication quality information acquired by communication quality acquisition unit 102, information presentation determining unit 104 determines whether there exists a position where the communication quality is equal to or more than the quality threshold, and at the same time, where the action cost is less than or equal to a predetermined value (action cost threshold). Note that, in the present example, it is assumed that the action cost threshold represents a distance, and is, for example, 300 m.

Referring to FIG. 3, a position "35.682748, 139.763736" described in the second row satisfies the condition. When a position satisfying the condition exists, information presentation determining unit 104 determines that action information of moving to the position satisfying the condition is to be presented. On the other hand, when no position satisfying the condition exists, it is impossible to obtain a communication quality necessary for an application by moving. Therefore, information presentation determining unit 104 determines that action information is not to be presented.

In this way, information presentation determining unit 104 determines based on the quality threshold and the action cost threshold. Thereby, information presentation determining unit 104 determines that action information is presented only when a communication quality necessary for an application can be obtained by taking a presented action, and when a cost of the presented action is low. This enables information presenting device 10 to accurately present information to a user.

Note that information presentation determining unit 104 may determine that action information is not to be presented even when a communication quality necessary for an application can be obtained by taking a presented action and a cost of the presented action is low if an improvement rate of a communication quality is an extremely low and less than or equal to a predetermined value.

When an improvement rate of a communication quality is low, it is considered that a user does not feel that the communication quality is improved, even by taking a presented action. Thus, it is also considered that an advantage enjoyed by a user is small even when the action is adopted. In such a case, information presenting device 10 can more accurately present information by determining that action information is not to be presented.

Action information generating unit 105 generates action information, based on the application determined by application acquisition unit 101, the communication quality information acquired by communication quality acquisition unit 102, the communication quality improved by the action that improves communication quality, and the action cost calculated by action cost calculation unit 103. The action information is information related to the action that improves communication quality presented by information presenting unit 106, and includes, for example, a current communication quality, an action that improves communication quality, a change amount of a communication quality due to the action, and a cost of the action. One example of a method by which action information generating unit 105 generates action information is described below.

Action information generating unit 105 generates, for example, action information based on an action having the lowest action cost among actions having communication qualities equal to or more than the quality threshold and having action costs less than or equal to the action cost threshold. For example, it is assumed that current radio wave intensity is a radio wave intensity of "−103 dBm", a quality threshold is a radio wave intensity of "−95 dBm", and an action cost threshold is a movement distance of "300 m". In the example of FIG. 3, a position "35.682748, 139.763736" is a position satisfying both the thresholds and having the minimum action cost.

Therefore, as action information presented at information presenting unit 106, action information generating unit 105 generates, for example, "moving a distance of '160 m' to a position '35.682748, 139.763736' and thus improving the current radio wave intensity of '−103 dBm' to '−91 dBm'.

Thus, action information generating unit 105 generates action information, based on an action having the minimum action cost, thereby enabling a user of information presenting device 10 to know an action serving to obtain a communication quality necessary for an application at the minimum action cost.

Note that the example exhibited herein is one example only, and action information generating unit 105 may generate action information by another method. For example, action information generating unit 105 may generate action information, based on an action having the best communication quality among actions having communication qualities equal to or more than the quality threshold and having action costs less than or equal to the action cost threshold. This enables a user of information presenting device 10 to know an action by which the best communication quality can be obtained among action costs within an allowable range.

Information presenting unit 106 presents the action information generated by action information generating unit 105 to a user of information presenting device 10, based on a result of determination by information presentation determining unit 104. For example, suppose a case where action information generating unit 105 generates, as action information, movement to the position "35.682748, 139.763736" in the second row in FIG. 3. In this case, information presenting unit 106 presents, to a user of information presenting device 10, that a communication quality will be improved by moving to the position "35.682748, 139.763736".

FIG. 5 is a view illustrating one example of action information presented by information presenting unit 106. In a left part of FIG. 5, a current communication quality, and a communication quality improved by a presented action are displayed. In the left part of FIG. 5, the current communication quality is represented by using a black square, and the communication quality changed by an action that improves communication quality is represented by using white squares. The number of squares indicates whether a communication quality is good or poor, and a greater number of squares indicates a better communication quality. Moreover, an arrow drawn above the black square indicates, by length thereof, an improvement amount of a communication quality. In other words, an arrow indicates a greater improvement amount when length thereof is longer.

A map is displayed in a right part of FIG. 5. A black spot indicates a current position of information presenting device 10, and a white spot indicates a position in the action information. According to the example of FIG. 5, a user of information presenting device 10 is able to know an action that improves communication quality and a cost of the action, by referring to the action information presented by information presenting unit 106.

Note that the method of displaying action information exhibited herein is one example only, and information presenting unit 106 may use another method. For example, information presenting unit 106 may display a movement route as represented by an arrow in FIG. 5. This enables information presenting unit 106 to present how to move in order to improve a communication quality, to a user of information presenting device 10, in a way easy to understand. Moreover, as an action cost, information presenting unit 106 may indicate a movement distance by a numerical value, or indicate time needed for movement. This enables information presenting unit 106 to present a cost of an action necessary to improve a communication quality, to a user of information presenting device 10, in a way easy to understand.

Note that action information generating unit 105 does not necessarily needs to generate one piece of action information, and may generate a plurality of pieces of action information. For example, in the example of FIG. 5, action information generating unit 105 may present action information other than that represented in FIG. 5, by detecting that a "Details" button is pressed by a user. This enables a user of information presenting device 10 to select an action best suited to a situation, among candidates of actions that improves communication quality.

Figure 6:
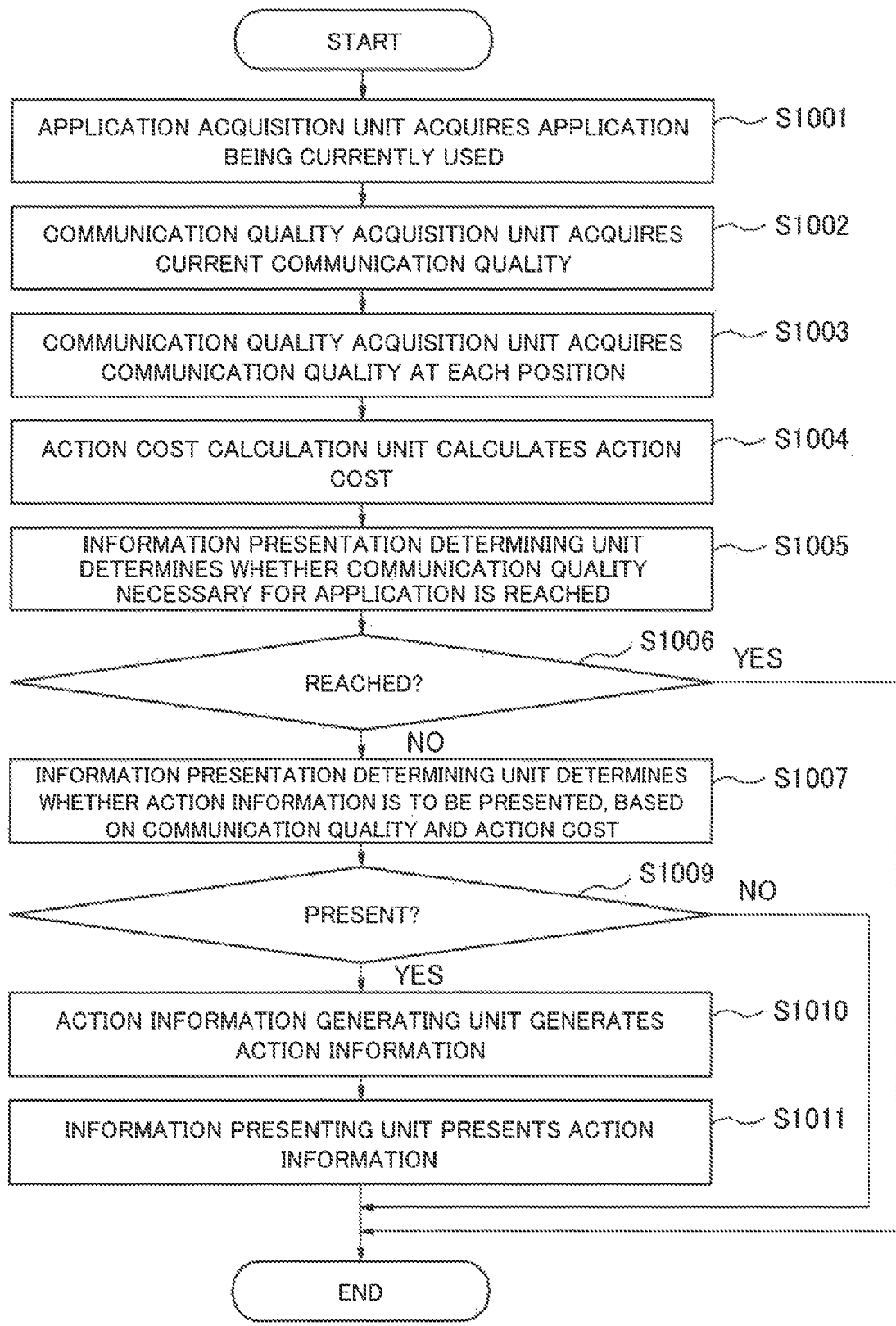
FIG. 6 is a flowchart illustrating an operation example of the information presenting device according to the first example embodiment of the present invention.

Next, an operation example of information presenting device 10 according to the first example embodiment is described with reference to a flowchart in FIG. 6.

First, application acquisition unit 101 acquires an application currently used in information presenting device 10 (step S1001). In the present example, it is assumed that an application called a "C browser" is being used. Next, communication quality acquisition unit 102 acquires a current communication quality (step S1002). Note that, in this instance, communication quality acquisition unit 102 also acquires a current position of information presenting device 10. In the present example, it is assumed that the current position and the current communication quality have values in the first row in FIG. 2.

Next, in step S1003, communication quality acquisition unit 102 acquires communication quality at each position other than the current position, and generates communication quality information together with the communication quality of the current position acquired in step S1002. In the present example, it is assumed that, for example, communication quality acquisition unit 102 generates the communication quality information illustrated in FIG. 2.

Next, action cost calculation unit 103 calculates an action cost for each position in the communication quality information generated in step S1003 (step S1004). In the present example, it is assumed that the action cost is a movement distance, and action cost calculation unit 103 calculates a movement distance in the case of moving from the current position to each position in the communication quality information. In the present example, it is assumed that the action cost calculated in step S1004 is as illustrated in FIG. 3.

Next, information presentation determining unit 104 determines whether the current communication quality acquired in step S1002 satisfies communication quality necessary for the application acquired in step S1001 (step S1005). It is assumed that a communication quality value (quality threshold) necessary for each application is previously provided in information presentation determining unit 104, and is the quality threshold illustrated in FIG. 4 in the present example. In the present example, the application acquired in step S1001 is the "C browser", the current communication quality (radio wave intensity in the present example) is "−103 dBm", and the quality threshold of the "C browser" is "−95 dBm". Therefore, information presentation determining unit 104 determines that the communication quality necessary for the application is not reached (No in step S1006).

In that case, information presentation determining unit 104 determines whether to present information (action information) related to an action that improves communication quality, based on the communication quality information generated in step S1003 and the action cost calculated in step S1004 (step S1007). Specifically, when a position satisfying the quality threshold and having an action cost less than or equal to a predetermined value (action cost threshold) exists, information presentation determining unit 104 determines that action information is to be presented. In the present example, it is assumed that the action cost threshold is "300 m". Referring to the second row of the list in FIG. 3, the position "35.682748, 139.763736" satisfies the condition, and information presentation determining unit 104 therefore determines that action information is to be presented (Yes in step S1009).

In that case, action information generating unit 105 generates action information to be presented by information presenting unit 106 (step S1010). In the present example, action information that communication quality will be improved from "−103 dBm" to "−91 dBm", by moving to the position "35.682748, 139.763736", is generated. Thereafter, information presenting unit 106 presents the action information (step S1011). In the present example, information presenting unit 106 presents, to a user of information presenting device 10, that communication quality will be improved by moving to, for example, the position "35.682748, 139.763736".

Note that, when the communication quality necessary for the application is reached in step S1005 (Yes in step S1006), and when the communication quality necessary for the application is reached and no position less than or equal to the action threshold exists in step S1007 (No in step S1009), information presentation determining unit 104 determines that action information is not to be presented, and processing is ended.

As above, according to the first example embodiment, based on an application being currently used, communication quality necessary for the application, a current communication quality, communication quality obtained by a predetermined action, and a cost of the action, information presenting device 10 determines whether to present the action to a user of the information presenting device. Thus, information presenting device 10 can effectively present an action that improves communication action to a user of the information presenting device.

For example, when a communication quality sufficient for use of an application being currently used can be obtained, when almost no improvement of a communication quality can be obtained by a presented action, or when a communication quality can be improved but a cost of a presented action is high, it is considered that a user of the information presenting device does not adopt the presented action. In this instance, the presented action information is information unnecessary for a user. In such a case, information presenting device 10 can suppress the presentation of the information unnecessary for a user, by suppressing the presentation of the action information.

On the other hand, when a quality necessary for the application being currently used cannot be obtained, and a sufficient improvement of a communication quality can be obtained by a presented action having a low action cost, there is a high possibility that a user adopts the presented action. According to the first example embodiment, information presenting device 10 can certainly present an action that improves communication quality in such a case.

Modification Example

Note that, although a movement distance is used as an action cost in the case described in the first example embodiment, information presenting device 10 may use another element as an action cost. For example, in addition to a movement distance, information presenting device 10 may use an index reflecting easiness of staying at a position to which movement is made. For example, when a movement distance is short but a position of a movement destination is in the center of a road where a traffic volume is large, it is considered that using an application is difficult even when movement is made to the position. Information presentation determining unit 104 determines that an action cost of movement to such a position, which is difficult to stay, is high, thereby making it possible to suppress presentation of unnecessary action information.

In addition, while radio wave intensity is described by way of example as a communication quality in the first example embodiment, a communication quality may be another index value. Information presenting device 10 may further use, for example, signal to an interference plus noise power ratio (SINR). A communication speed is affected by noise and interference in addition to radio wave intensity. Therefore, information presenting device 10 can more precisely determine by using the SINR whether a communication quality sufficient for use of an application is obtained.

Furthermore, information presenting device 10 may use a degree of congestion of a base station as a communication quality. Generally, when a base station is congested, a communication quality sensed by a user deteriorates. By considering a degree of congestion of a base station, information presenting device 10 can more precisely determine whether a communication quality sufficient for use of an application is obtained. Alternatively, information presenting device 10 may use a communication throughput as a communication quality. By using a communication throughput, it becomes possible to precisely determine whether a communication quality sufficient for use of an application is obtained. Note that, in order to obtain a communication throughput, information presenting device 10 generally needs to pass large data to a network, thus imposing a load on the network. The above-described determination techniques based on radio wave intensity, the SINR, and a degree of congestion also have an advantage of being able to suppress a network load.

Moreover, although movement from one place to another is described as a presented action in the first example embodiment, a presented action may be another action. Information presenting device 10 may present, for example, an action of suspending use of an application until a certain time. In that case, communication quality acquisition unit 102 acquires the communication quality at a current time point (e.g., time) and one or more other time points. Then, action cost calculation unit 103 needs only to calculate a waiting time from the current time point to the one or more other time points as an action cost. In other words, information presenting device 10 uses a time of suspending use of an application as an action cost.

A communication quality varies depending on time during one day, due to a change in a degree of congestion or the like even at the same position. Therefore, when an improvement of a communication quality can be expected by elapse of time, it becomes possible to use an application in a good state of a communication quality by suspending use of an application for a certain time. Presenting suspension of use of an application for a certain time enables a user to improve operation efficiency, by performing another operation (e.g., use of an application that does not perform communication, or the like) in this period, and resuming the use of the application after a communication quality is improved.

Alternatively, in this instance, information presenting device 10 may simultaneously present an application use of which is recommended. The application recommended by information presenting device 10 is an application which is small in communication amount, and a current communication quality of which satisfies a quality threshold of the application. This makes it possible to prevent a user of the information presenting device from using the application with a communication quality insufficient for the use of the application.

Herein, application acquisition unit 101, communication quality acquisition unit 102, action cost calculation unit 103, information presentation determining unit 104, action information generating unit 105, and information presenting unit 106 are consist of logic circuits and semiconductor storage devices.

Information presenting device 10 can also be achieved by computer device 40 including program 43.

Figure 10:
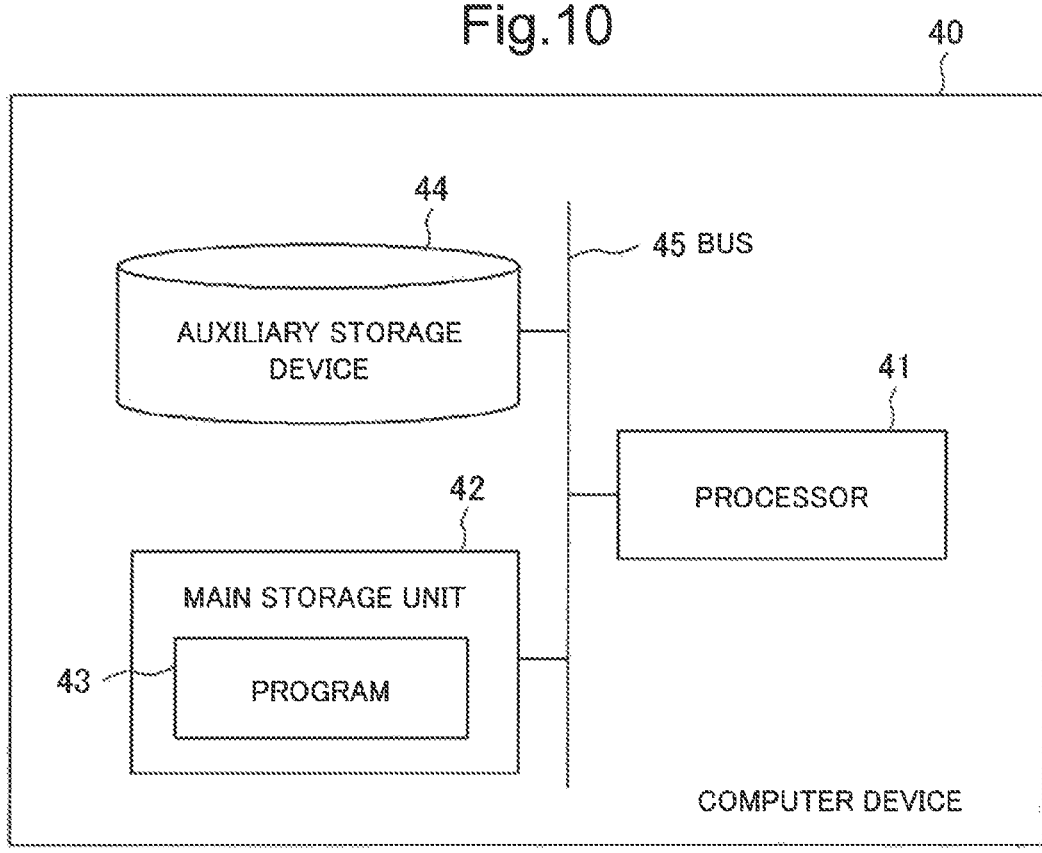
FIG. 10 is a diagram illustrating a configuration example of a computer device.

FIG. 10 is a configuration diagram of computer device 40. Computer device 40 includes processor 41, main storage unit 42, and auxiliary storage device 44 which are interconnected by bus 45. Herein, for example, main storage unit 42 is a semiconductor storage device, and auxiliary storage device 44 is a hard disk drive (HDD) or a solid state drive (SDD). Main storage unit 42 stores program 43.

Program 43 is executed in processor 41, and thereby causes processor 41 to function as application acquisition unit 101, communication quality acquisition unit 102, action cost calculation unit 103, information presentation determining unit 104, action information generating unit 105, or information presenting unit 106.

Second Example Embodiment

Next, a second example embodiment is described.

In the first example embodiment, information presenting device 10 determines whether to present information (action information) related to an action that improves communication quality, based on an application being currently used, current communication quality, a communication quality obtained by a predetermined action, and a cost of the action. In the second example embodiment, information presenting device 11 determines whether to present action information by further using a history of whether a user of information presenting device 11 follows presented action information. This enables information presenting device 11 to more effectively presents action information.

Generally, how a presented action is felt depends on a user. For example, some users feel that movement of 100 m is long, while other users feel that movement of 100 m is short. In other words, whether to adopt a presented action depends on users even when the action is the same action. Therefore, by reflecting a difference of adoption/rejection standards of action information among users in determination, it becomes possible to more effectively present action information. Accordingly, in the second example embodiment, by using a history of whether a user follows presented action information, information presenting device 11 performs information presentation using an adoption/rejection standard for each user, and more effectively presents action information.

Figure 7:
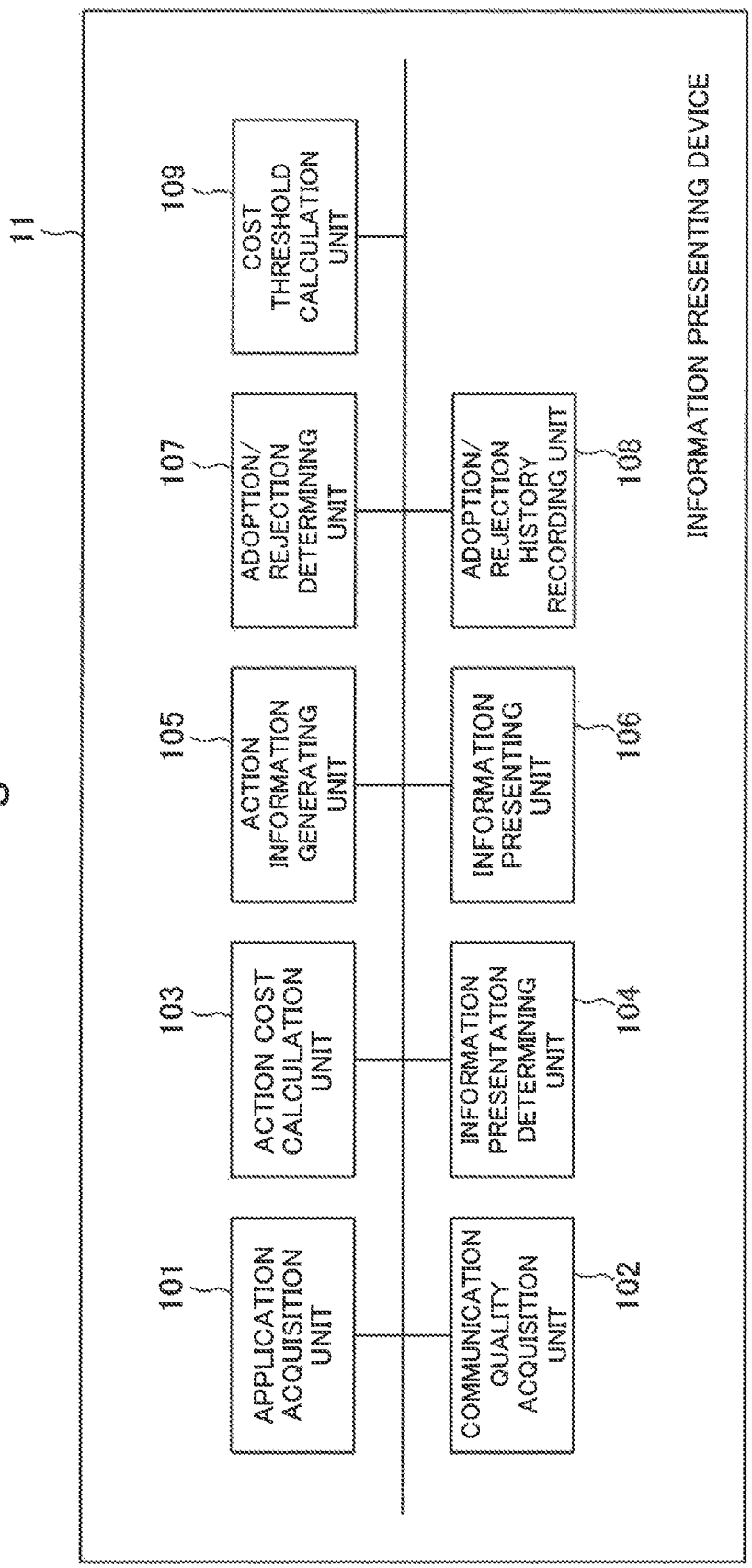
FIG. 7 is a block diagram illustrating one example of a configuration of an information presenting device according to a second example embodiment of the present invention.

A configuration of information presenting device 11 according to the second example embodiment is described with reference to FIG. 7. Information presenting device 11 according to the second example embodiment includes application acquisition unit 101, communication quality acquisition unit 102, action cost calculation unit 103, information presentation determining unit 104, action information generating unit 105, information presenting unit 106, adoption/rejection determining unit 107, adoption/rejection history recording unit 108, and cost threshold calculation unit 109. Information presenting device 11 according to the second example embodiment is different from information presenting device 10 according to the first example embodiment in including adoption/rejection determining unit 107, adoption/rejection history recording unit 108, and cost threshold calculation unit 109. Moreover, in the following description, components which are the same as or similar to those in the first example embodiment are given the same or similar reference signs, and detailed descriptions thereof are omitted.

Note that information presenting device 11 also includes components that are typically included in a portable information processing device such as a tablet terminal device, a smartphone, or a mobile phone. The general component is, for example, a processor and an operating system which execute an application. However, herein, descriptions of these components are omitted.

Adoption/rejection determining unit 107 determines whether a user of information presenting device 11 has adopted an action described in action information presented in information presenting unit 106. For example, when the user moves to a position specified in the action information, by constantly monitoring position information of information presenting device 11 by a GPS or the like, adoption/ rejection determining unit 107 determines that the user has adopted the action information.

Note that the method of performing adoption/rejection determination exhibited herein is one example only. Adoption/rejection determining unit 107 may determine by any other method that enables whether to adopt action information to be determined. For example, adoption/rejection determining unit 107 may display, on information presenting device 11, a dialog inquiring of a user whether to adopt action information, and may cause the user to directly input adoption/rejection. This enables adoption/rejection determining unit 107 to determine adoption/rejection with a high degree of accuracy. On the other hand, the technique of constantly monitoring position information of information presenting device 11 has an advantage that a user has no need to input.

Adoption/rejection history recording unit 108 records the adoption/rejection determination, by adoption/rejection determining unit 107, regarding the presented action information, as adoption/rejection information. As the adoption/rejection information, at least an action cost calculated by action cost calculation unit 103, and a result of determination by adoption/rejection determining unit 107 are recorded. One example of adoption/rejection information recorded by adoption/rejection history recording unit 108 is illustrated in FIG. 8.

As illustrated in FIG. 8, adoption/rejection information in the present example is recorded in adoption/rejection history recording unit 108 as a table in which an action cost and an adoption/rejection result are on a column. An action cost is a movement distance in the present example. For example, a first row on the table in FIG. 8 indicates that an action cost of certain action information is "130 m", and is adopted by a user (described as "○" in FIG. 8). Further, a second row on the table in FIG. 8 indicates that a cost of different action information is "240 m", and is not adopted by a user (described as "×" in FIG. 8).

Note that adoption/rejection information exhibited herein is one example only, and may include other information. Adoption/rejection information may include, for example, a communication quality, include an application being used, or include time when action information is presented.

Cost threshold calculation unit 109 calculates an action cost threshold to be used by information presentation determining unit 104, based on the adoption/rejection information recorded by adoption/rejection history recording unit 108. In information presenting device 10 according to the first example embodiment, an action cost threshold is a previously provided predetermined value. In information presenting device 11 according to the second example embodiment, cost threshold calculation unit 109 dynamically sets an action cost threshold, based on a history of a past adoption/rejection result of action information. Therefore, information presenting device 11 reflects a difference of adoption/rejection standards of action information among users, and can thus more effectively present action information.

One example of a method by which cost threshold calculation unit 109 calculates an action cost threshold is described below.

First, cost threshold calculation unit 109 extracts an action cost of a row in which an adoption/rejection result is "○", in adoption/rejection information recorded by adoption/rejection history recording unit 108. For example, in the example of FIG. 8, "130 m" in the second row, "240 m" in the fifth row, . . . , which adoption/rejection results are "0", are extracted.

Next, cost threshold calculation unit 109 rearranges extracted action costs in ascending order, and extracts a value of an action cost corresponding to a predetermined rate from the bottom. In the present example, it is assumed, for example, that the predetermined rate is 95%, and a value (95% value) of the action cost corresponding to 95% from the bottom is "300 m". Cost threshold calculation unit 109 calculates an action cost threshold by multiplying the obtained value of the action cost by a predetermined value of more than 1. In the present example, it is assumed that "1.2" is multiplied. Accordingly, an action cost threshold is calculated at "360 m" by 300×1.2. A value resulting from a 95% value multiplied by a predetermined value is used as an action cost threshold. Thereby, when a user adopts action information having an exceptionally high action cost, cost threshold calculation unit 109 can keep a value of an action cost threshold from being set to an inappropriately great value.

Note that, in the example described above, a predetermined value of more than 1 is set to 1.2 in order for information presenting device 11 to be able to correct an action cost threshold to a greater value, when an allowable value for an action cost of a user becomes greater along with time. By setting to a value slightly greater than 1, information presenting device 11 presents action information, even when a value is slightly greater than an assumed allowable value of an action cost of a user. A user adopts the action information in such a case, and information presenting device 11 can thereby detect that an allowable value of a user has become greater.

The method of calculating an action cost threshold exhibited in the present example is one example only, and cost threshold calculation unit 109 may use another method.

Herein, application acquisition unit 101, communication quality acquisition unit 102, action cost calculation unit 103, information presentation determining unit 104, action information generating unit 105, information presenting unit 106, adoption/rejection determining unit 107, adoption/rejection history recording unit 108, and cost threshold calculation unit 109 are consist of logic circuits and semiconductor storage devices.

Information presenting device 10 can also be achieved by computer device 40 in FIG. 10. Program 43 in FIG. 10 is executed in processor 41, and thereby causes processor 41 to function as application acquisition unit 101, communication quality acquisition unit 102, action cost calculation unit 103, information presentation determining unit 104, action information generating unit 105, information presenting unit 106, adoption/rejection determining unit 107, adoption/rejection history recording unit 108, or cost threshold calculation unit 109.

Figure 9:
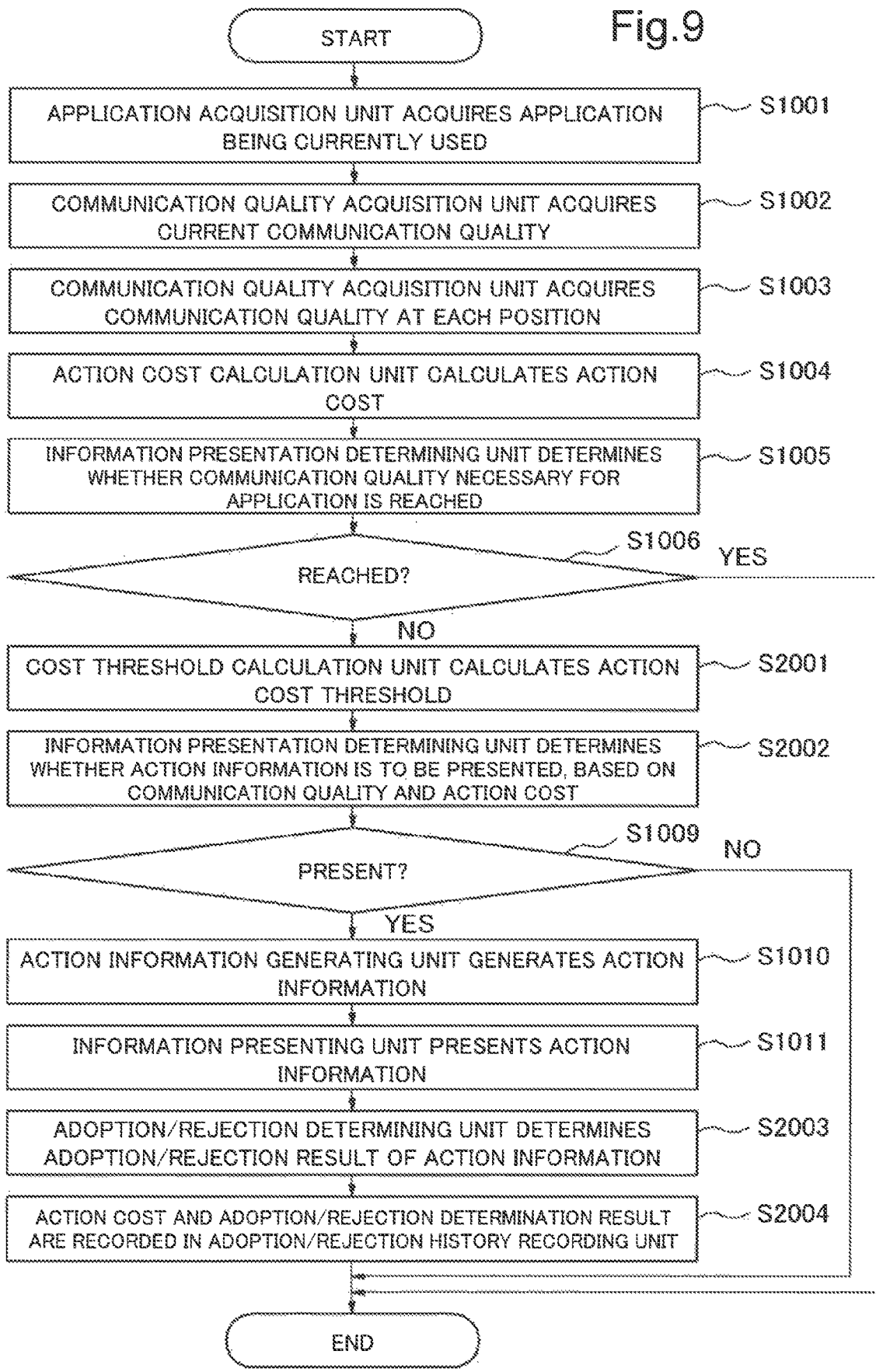
FIG. 9 is a flowchart illustrating an operation example of the information presenting device according to the second example embodiment of the present invention.

Next, an operation example of information presenting device 11 according to the second example embodiment is described in detail with reference to FIG. 9. Note that, in the following description, the same processing as that in the operation example according to the first example embodiment is given the same reference sign, and a detailed description thereof is omitted.

From the processing (step S1001) in which application acquisition unit 101 acquires an application being currently used to the processing (step S1005) in which information presentation determining unit 104 determines whether a communication quality necessary for the application is reached, the operation example according to the second example embodiment is similar to the operation example according to the first example embodiment. A detailed description of this part is omitted. Moreover, an operation when it is determined in step S1005 that the communication quality necessary for the application is reached (Yes in step S1006) is also similar to that in the operation example according to the first example embodiment.

When it is determined in step S1005 that the communication quality necessary for the application is not reached (No in step S1006), cost threshold calculation unit 109 calculates an action cost threshold (step S2001). A method of calculating an action cost threshold is as described above.

Next, information presentation determining unit 104 determines whether action information is to be presented (step S2002). In step S2002 according to the second example embodiment, information presentation determining unit 104 uses the action cost threshold calculated in step S2001, instead of using a predetermined action cost threshold. In this respect, step S2002 according to the second example embodiment is different from step S1007 according to the first example embodiment.

In step S2002, when information presentation determining unit 104 determines action information is to be presented (Yes in step S1009), action information generating unit 105 generates action information, and information presenting unit 106 presents the action information to a user of information presenting device 11 (steps S1010 and S1011).

Next, adoption/rejection determining unit 107 determines whether a user of information presenting device 11 has adopted the action information presented in step S1011 (adoption/rejection result) (step S2003). Adoption/rejection history recording unit 108 records the action cost calculated in step S1004, and the adoption/rejection result determined in step S2003 (step S2004). Note that the information recorded in step S2004 is referred to when step S2001 is executed next time.

As above, information presenting device 11 according to the second example embodiment can perform information presentation reflecting an adoption/rejection standard for each user, by using a history of whether a user follows presented action information, and can therefore more effectively present action information.

Note that, in the preset example, cost threshold calculation unit 109 calculates an action cost threshold by using a past action cost and an adoption/rejection result for action information, but may calculate an action cost threshold by using other information. For example, cost threshold calculation unit 109 may use application information acquired by application acquisition unit 101. By using the application information, cost threshold calculation unit 109 can set an optimum action cost threshold for each application.

Alternatively, cost threshold calculation unit 109 may use a communication quality at a position for which action information is presented. It is considered that an adoption/rejection standard by a user for an action cost differs depending on a degree of deterioration of a communication quality. For example, it is considered that, when deterioration of a communication quality is significant, and use of an application is nearly impossible, a possibility that a user adopts presented action information is higher even though an action cost is slightly high. Cost threshold calculation unit 109 calculates an action cost threshold by using a communication quality at a position for which action information is presented. Thereby, it becomes possible to present action information, reflecting a difference of adoption/rejection standards for the respective communication qualities as described above.

Alternatively, cost threshold calculation unit 109 may calculate an action cost threshold by using time when action information is presented. For example, it is considered that, in a period of time such as a period of commuting time in which a user is in a hurry, a possibility of adopting action information is low even when the action information is presented. By calculating an action cost threshold by further using time when action information is presented by cost threshold calculation unit 109, and current time, cost threshold calculation unit 109 can present action information, reflecting a difference of adoption/rejection standards of users for each period of time as described above.

Third Example Embodiment

Next, a third example embodiment is described.

Figure 11:
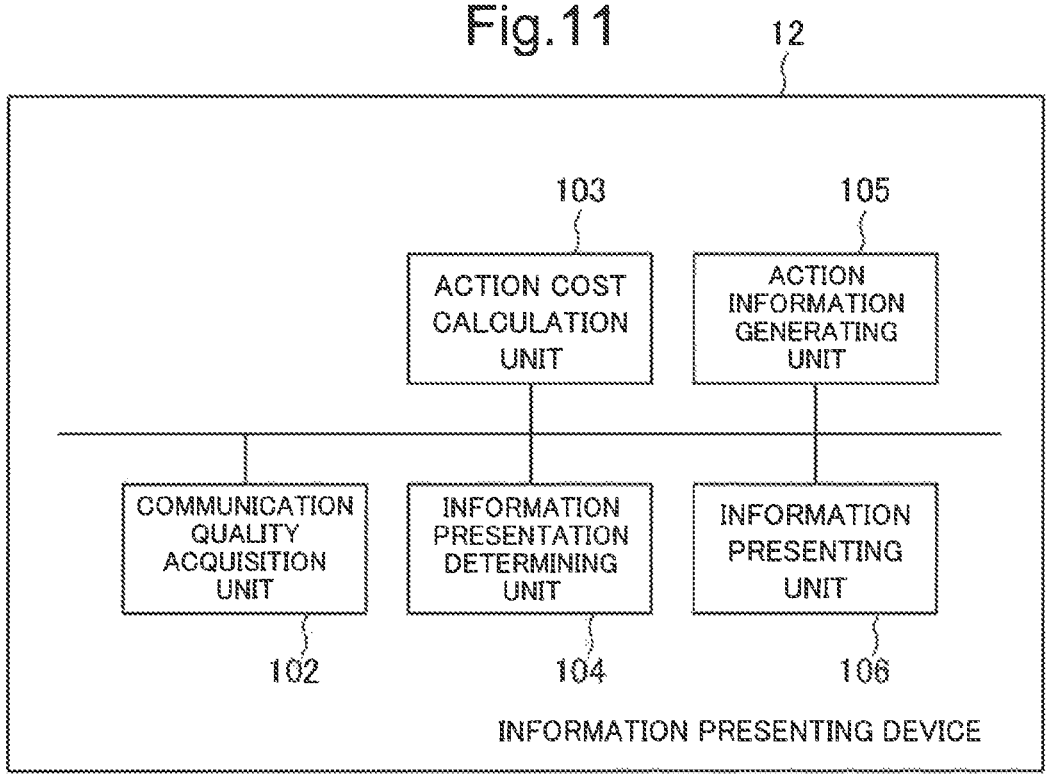
FIG. 11 is a block diagram illustrating one example of a configuration of an information presenting device according to a third example embodiment of the present invention.

A configuration of information presenting device 12 according to the third example embodiment is described with reference to FIG. 11. Information presenting device 12 according to the third example embodiment includes communication quality acquisition unit 102, action cost calculation unit 103, information presentation determining unit 104, action information generating unit 105, and information presenting unit 106. Information presenting device 12 according to the third example embodiment is different from information presenting device 10 according to the first example embodiment in not including application acquisition unit 101. Further, in the present example embodiment, it is assumed that a communication quality needed for information presenting device 12 is constant without depending on an application. In other words, in the present example embodiment, information presentation determining unit 104 performs determination that is not dependent on an application.

Moreover, in the following description, components which are the same as or similar to those in the first example embodiment are given the same or similar reference signs, and detailed descriptions thereof are omitted.

Note that information presenting device 12 also includes components that are typically included in a portable information processing device such as a tablet terminal device, a smartphone, or a mobile phone. The general component is, for example, a processor and an operating system which execute an application. However, herein, descriptions of these components are omitted.

Communication quality acquisition unit 102 acquires a current communication quality, and a communication quality when a user takes an action. Action cost calculation unit 103 calculates a cost of the action. Information presentation determining unit 104 determines whether information about the action is to be displayed, based on the current communication quality, the communication quality when the action is taken, and the action cost. In response to determination, by information presentation determining unit 104, that information about the action is to be displayed, action information generating unit 105 determines an action, based on the communication quality when the action is taken, and the action cost. Information presenting unit 106 displays the information about the action determined by the action information generating unit.

In the third example embodiment, based on a current communication quality, a communication quality obtained by a predetermined action, and a cost of the action, information presenting device 12 determines whether to present the action to a user of the information presenting device. Thus, information presenting device 12 can effectively present an action that improves communication action to a user of the information presenting device.

While the invention of the present application has been described above with reference to the example embodiments, the invention of the present application is not limited to the example embodiments described above. Various alterations that can be appreciated by a person skilled in the art can be made to a configuration and details of the invention of the present application within the scope of the invention of the present application.

This application is based upon and claims the benefit of priority from Japanese Patent Application No. 2016-100410, filed on May 19, 2016, the disclosure of which is incorporated herein in its entirety by reference.

REFERENCE SIGNS LIST

10 Information presenting device
11 Information presenting device
12 Information presenting device
40 Computer device
41 Processor
42 Main storage unit
43 Program
44 Auxiliary storage device
45 Bus
101 Application acquisition unit
102 Communication quality acquisition unit
103 Action cost calculation unit
104 Information presentation determining unit
105 Action information generating unit
106 Information presenting unit
107 Adoption/rejection determining unit
108 Adoption/rejection history recording unit
109 Cost threshold calculation unit

What is claimed is:

1. An information presenting device comprising:
a processor;
a memory storing instructions executable by the processor to:
acquire current communication quality and communication quality when a user takes an action;
calculate a cost of the action, which is a moving distance of the user or a moving time of the user when the user moves, necessary for the action of moving;
determine information about the action that is to be displayed, in a case that the current communication quality is below a predetermined communication quality threshold, the communication quality is above the predetermined communication quality threshold when the action was taken, and the cost of the action is below a predetermined action cost threshold that varies by time period;
determine the action based on the communication quality when the action is taken and the action cost when the processor determines the information about the action that is to be displayed; and
display the information about the action in response to the processor determining the information about the action.

2. The information presenting device according to claim 1, wherein the instructions are executable by the processor to further:
determine an application program performing communication, wherein
the processor determines the information about the action that is to be displayed based on the application program, the current communication quality, the communication quality when the action is taken, and the action cost, and
the processor determines the action that alters at least one of a position where the communication is performed, a time of performing the communication, and a communication amount of the communication.

3. The information presenting device according to claim 2, wherein
the processor acquires the communication quality at a current position and one or more other points,
the processor acquires a movement distance from the current position to each of the one or more other points as the action cost,
the processor determines the information about the action that is to be displayed based on the application program, the communication quality at the current position, the communication quality when movement is made from the current position to each of the one or more other points, and the action cost for each of the one or more other points, and
the processor selects one point from the one or more other points, based on the communication quality when the movement is made from the current position to each of the one or more other points, and the action cost for each of the one or more other points, and determines the movement to the one point that has been selected as the action.

4. The information presenting device according to claim 2, wherein
the processor acquires the communication quality at a current time point and one or more other time points,
the processor acquires a waiting time from the current time point to each of the one or more other time points as the action cost,
the processor determines the information about the action that is to be displayed based on the application program, the communication quality at the current time point, the communication quality when waited from the current time point to each of the one or more other time points, and the action cost for each of the one or more other time points, and
the processor selects one time point from the one or more other time points, based on the communication quality when waited from the current time point to each of the one or more other time points and the action cost for each of the one or more other time points, and determines postponement of the communication up to the time point that has been selected as the action.

5. The information presenting device according to claim 2, wherein
the processor determines the information about the action that is to be displayed, when the current communication quality is lower than a quality threshold designated for the application program, the communication quality becomes higher than the quality threshold designated for the application program as a result of the action, and the action cost is less than or equal to a predetermined action threshold.

6. The information presenting device according to claim 2, wherein the instructions are executable by the processor to further:
determine whether or not the user acts in accordance with the information about the action displayed by the processor; and
record a determination result of a processor adoption/rejection history, wherein
the processor further determines the information about the action that is to be displayed based on the processor adoption/rejection history.

7. An information presenting method comprising:
acquiring current communication quality and communication quality when a user takes an action;
calculating a cost of the action, which is a moving distance of the user or a moving time of the user when the user moves, necessary for the action of moving;
determining information about the action that is to be displayed, in a case that the current communication quality is below a predetermined communication quality threshold, the communication quality is above the predetermined communication quality threshold when the action was taken, and the cost of the action is below a predetermined action cost threshold that varies by time period;
determining the action based on the communication quality when the action is taken and the action cost when the information about the action that is to be displayed is determined; and
displaying the information about the action in response to determining the information about the action.

8. The information presenting method according to claim 7, further comprising:
determining an application program performing communication;
acquiring the communication quality at a current position and one or more other points;
acquiring a movement distance from the current position to each of the one or more other points as the action cost;
determining the information about the action that is to be displayed based on the application program, the communication quality at the current position, the communication quality when movement is made from the current position to each of the one or more other points, and the action cost for each of the one or more other points; and
selecting one point from the one or more other points, based on the communication quality when movement is made from the current position to each of the one or more other points, and the action cost for each of the one or more other points, and determining the movement to the one point that has been selected as the action.

9. The information presenting method according to claim 7, further comprising:
determining an application program performing communication;
acquiring the communication quality at a current time point and one or more other time points;
acquiring a waiting time from the current time point to each of the one or more other time points as the action cost,
determining the information about the action that is to be displayed based on the application program, the communication quality at the current time point, the communication quality when waited from the current time point to each of the one or more other time points, and the action cost for each of the one or more other time points; and
selecting one time point from the one or more other time points, based on the communication quality when waited from the current time point to each of the one or more other time points and the action cost for each of the one or more other time points, and determining postponement of the communication up to the one time point that has been selected as the action.

10. A non-transitory computer readable storage medium storing an information presenting program causing a computer to execute:
communication quality acquisition processing of acquiring current communication quality and communication quality when a user takes an action;
action cost calculation processing of calculating a cost of the action, which is a moving distance of the user or a moving time of the user when the user moves, necessary for the action of moving;
information presentation determining processing of determining information about the action that is to be displayed, in a case that the current communication quality is below a predetermined communication quality threshold, the communication quality is above the predetermined communication quality threshold when the action was taken, and the cost of the action is below a predetermined action cost threshold that varies by time period;
action information generating processing of determining the action based on the communication quality when the action is taken and the action cost when the information presentation determining processing determines the information about the action that is to be displayed; and
information presenting processing of displaying the information about the action in response to the information about the action having been determined in the action information generating processing.

11. The information presenting device according to claim 3, wherein
the processor determines the information about the action that is to be displayed, when the current communication quality is lower than a quality threshold designated for the application program, the communication quality becomes higher than the quality threshold designated for the application program as a result of the action, and the action cost is less than or equal to a predetermined action threshold.

12. The information presenting device according to claim 4, wherein
the processor determines the information about the action that is to be displayed, when the current communication quality is lower than a quality threshold designated for the application program, the communication quality becomes higher than the quality threshold designated for the application program as a result of the action, and the action cost is less than or equal to a predetermined action threshold.

13. The information presenting device according to claim 3, wherein the instructions are executable by the processor to further:
determine whether or not the user acts in accordance with the information about the action displayed by the processor; and
record a determination result of a processor adoption/rejection history, wherein
the processor further determines the information about the action that is to be displayed based on the adoption/rejection history.

14. The information presenting device according to claim 4, wherein the instructions are executable by the processor to further:
determine whether or not the user acts in accordance with the information about the action displayed by the processor; and record a determination result of a processor adoption/rejection history, wherein the processor further determines the information about the action that is to be displayed based on the adoption/rejection history.

15. The information presenting device according to claim 5, wherein the instructions are executable by the processor to further:

determine whether or not the user acts in accordance with the information about the action displayed by the processor; and record a determination result of a processor adoption/rejection history, wherein the processor further determines the information about the action that is to be displayed based on the adoption/rejection history.

* * * * *